United States Patent [19]

Fletcher et al.

[11] 3,964,319

[45] June 22, 1976

[54] INSTRUMENTATION FOR MEASURING AIRCRAFT NOISE AND SONIC BOOM

[76] Inventors: James C. Fletcher, Administrator of the National Aeronautics and Space Administration, with respect to an invention of Allan J. Zuckerwar, Newport News, Va.

[22] Filed: July 1, 1975

[21] Appl. No.: 592,159

[52] U.S. Cl. .................................................. 73/557
[51] Int. Cl.² ........................................... G01L 11/00
[58] Field of Search ............ 73/552, 555, 556, 557, 73/558, 67, 71.4; 179/1 N, 133, 1 F; 332/2; 324/61 QS; 340/261

[56] References Cited
UNITED STATES PATENTS

| | | | |
|---|---|---|---|
| 3,012,197 | 12/1961 | Peterson et al. | 179/1 N |
| 3,154,170 | 10/1964 | Noiseux | 73/558 |
| 3,393,271 | 7/1968 | Fidi et al. | 179/1 F |
| 3,560,882 | 2/1971 | Beurrier et al. | 332/2 |
| 3,868,856 | 3/1975 | Fletcher | 73/557 |
| 3,913,024 | 10/1975 | Necoecha | 179/1 F |

*Primary Examiner*—Richard C. Queisser
*Assistant Examiner*—Stephen A. Kreitman
*Attorney, Agent, or Firm*—Howard J. Osborn; William H. King; John R. Manning

[57] ABSTRACT

Improvements in instrumentation suitable for measuring aircraft noise and sonic booms. A converter produces an electric current proportional to the sound pressure level at a condenser microphone. The electric current is transmitted over a cable and amplified by a zero drive amplifier. The converter consists of a local oscillator, a dual-gate field-effect transistor (FET) mixer and a voltage regulator/impedance translator. The local oscillator generates a carrier voltage that is applied to one of the gates of the FET mixer. The FET mixer mixes the microphone signal with the carrier to produce an electrical current at the frequency of vibration of the microphone diaphragm. The voltage regulator/impedance translator regulates the voltage of the local oscillator and mixer stages, eliminates the carrier at the output and provides a low output impedance at the cable terminals. The improvements include automatic tuning compensation against changes in static microphone capacitance and means for providing a remote electrical calibration capability.

10 Claims, 4 Drawing Figures

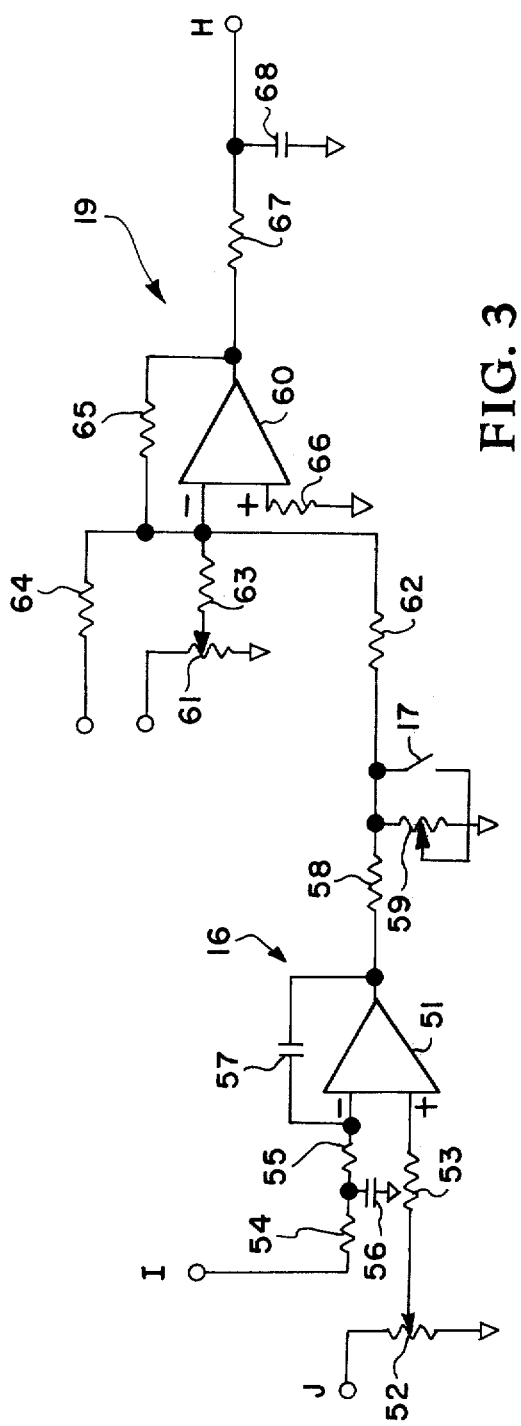
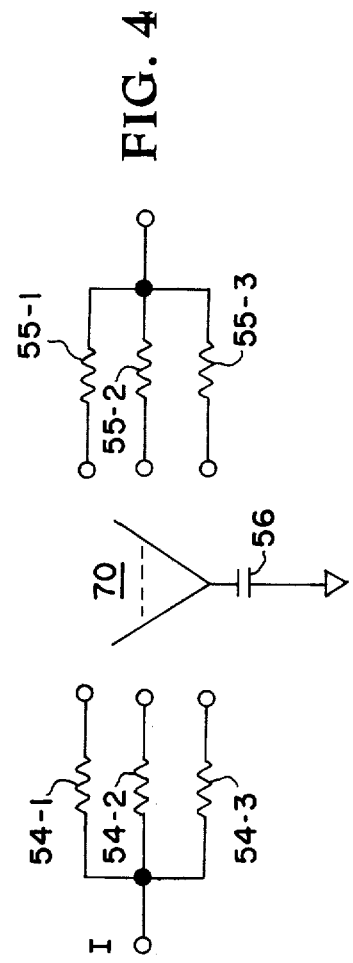
FIG. 3
FIG. 4

3,964,319

INSTRUMENTATION FOR MEASURING AIRCRAFT NOISE AND SONIC BOOM

ORIGIN OF THE INVENTION

The invention described herein was made in the performance of work under a NASA contract and is subject to the provisions of Section 305 of the National Aeronautics and Space Act of 1958, Public Law 85-568 (72 STAT 435; 42 USC 2457).

BACKGROUND OF THE INVENTION

The invention relates generally to the measurement of noise and more specifically concerns instrumentation for use in the measuring of aircraft noise and sonic boom.

This invention is an improvement in the invention disclosed in U.S. Pat. No. 3,868,856. The preceding invention was found excessively sensitive to changes in ambient temperature, owing to the pronounced temperature-sensitivity of the static microphone capacitance. The net effect of such changes is to detune the converter and reduce the conversion gain. The primary object of this invention is to develop automatic tuning compensation against changes in static microphone capacitance, in the face of severe temperature variations and other sources of long-term drift. Another object is to provide a remote electrical calibration capability, whereby an operator can calibrate the noise measurement system at a station located several thousand feet away from the microphone site.

SUMMARY OF THE INVENTION

The present invention consists of improvements in the invention, Instrumentation for Measurement of Aircaft Noise and Sonic Boom, disclosed in U.S. Pat. No. 3,868,856. The improvements include providing a remote electrical calibration capability and the use of a voltage-variable capacitance diode network to automatically tune the converter tank circuit to the carrier frequency.

BRIEF DESCRIPTION OF THE DRAWINGS

FIG. 3 is a schematic circuit diagram of the differential and summing amplifiers shown in FIG. 1; and FIG. 4 is an alternate filter section for use with the differential amplifier filter in FIG. 1.

DETAILED DESCRIPTION OF THE INVENTION

Figure 1:
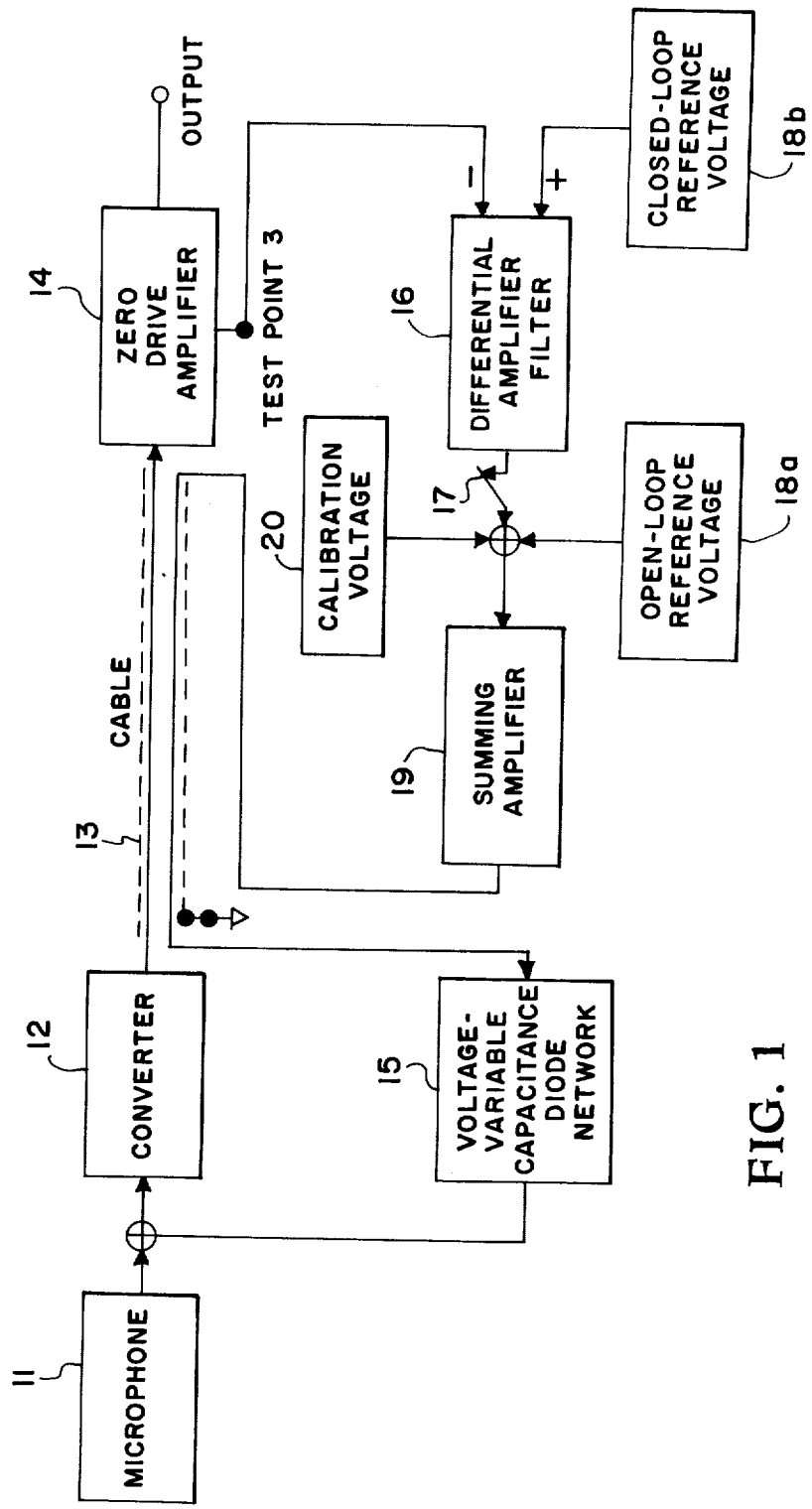
FIG. 1 is a block diagram of the system incorporating the invention.

Turning now to the embodiment of the invention selected for illustration in the drawing the number 11 in FIG. 1 designates a condenser microphone. A converter 12, consisting of a local oscillator, an FET mixer and a voltage regulator/impedance translator, produces an electric current proportional to the sound pressure level at the condenser microphone. The electric current is transmitted over a cable 13 and then amplified by a zero drive current amplifier 14. The current amplifier 14 is an N462 Zero Drive Amplifier, manufactured by MB Electronics, Inc., New Haven, Connecticut. A voltage-variable capacitance diode network 15 is used to tune the converter tank circuit to the carrier frequency, in place of the trimmer capacitor of the converter in U.S. Pat. No. 3,868,856.

The modified converter-zero drive system has two modes of operation, depending upon whether or not automatic tuning is connected into the system. In the "open-loop" mode a differential amplifier-filter 16 is disconnected from the system by means of a switch 17. Tuning of the converter is accomplished through adjustment of an open-loop reference voltage 18a, which controls the capacitance of the diode network 15. The system is switched, by means of switch 17, to the "closed-loop" mode for the purpose of maintaining a fixed converter tuning point. The direct component of the converter output voltage is highly sensitive to deviations from optimal tuning. These deviations are consequently reflected not in the voltage at the output of the zero drive amplifier, but rather in a voltage proportional to the output of the converter located at an internal point, designated as "test point 3" in the zero drive amplifier circuit 14. The difference between the testpoint 3 voltage and a closed-loop reference voltage 18b applied to the inverting and noninverting inputs of the differential amplifier-filter 16 respectively, provides a voltage at the output of the differential amplifier-filter, henceforth to be called the "error voltge." The output of a summing amplifier 19 is proportional to the sum of the error voltage and the open-loop reference voltage 18a, which together control the capacitance of the diode network 15.

The feedback loop is intended to pass only the slowly varying signals associated with long-term drift in microphone capacitance. If signals at the acoustical frequencies were permitted to pass through the feedback loop, they would cause variations in capacitance of the diode network which would cancel the capacitance variations of the microphone. In order to avoid cancellation of the acoustical signals, low-pass filtering is built into the differential amplifier 16. Signals at the relatively high acoustical frequencies are blocked, but those at low frequencies associated with the automatic control of the converter tuning point are permitted to complete the control loop.

In order to calibrate the system an a.c. electrical signal from a calibration source 20 is applied to the input of summing amplifier 19. The variations in diode capacitance caused by the calibration signal produce variations in output voltage similar to those produced by acoustical excitation of the microphone 11.

Figure 2:
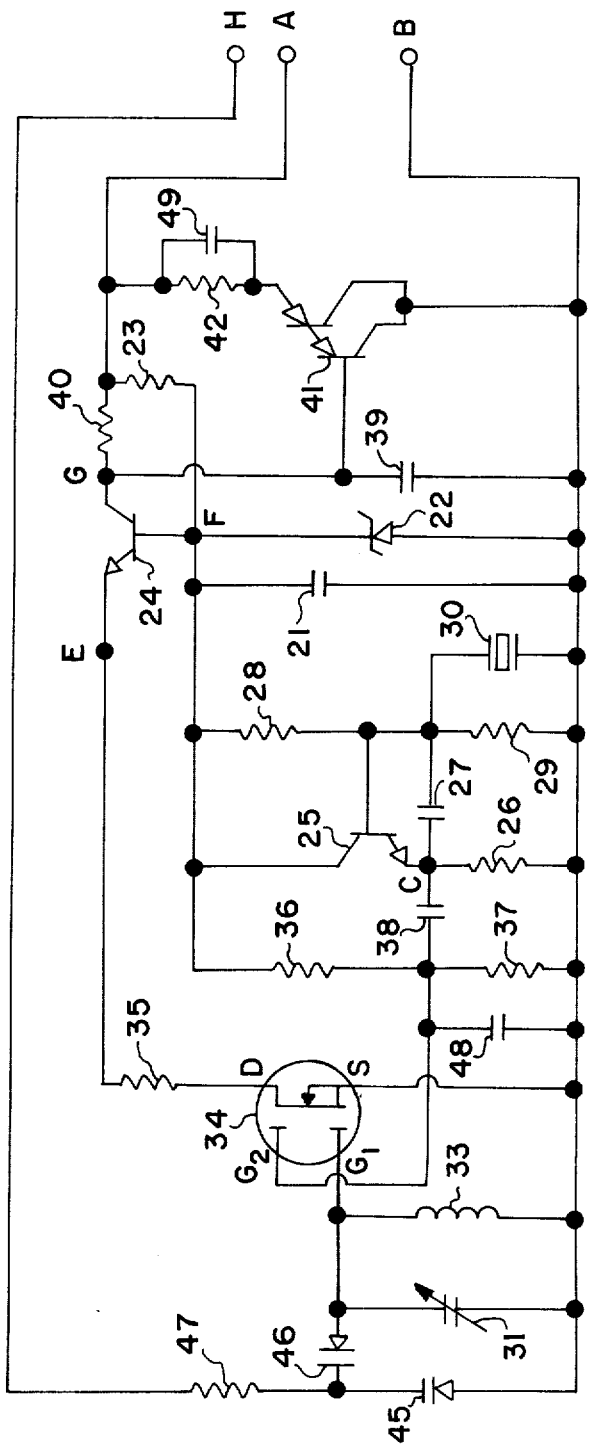
FIG. 2 is a schematic circuit diagram of the converter shown in FIG. 1.

The voltage regulator part of converter 12 consists of a capacitor 21, a zener diode 22 and a ballast resistor 23 in FIG. 2. Capacitor 21 and zener diode 22 are connected between a terminal B (ground) and a point F, and resistor 23 is connected between point F and a terminal A. Across the ballast resistor 23, the voltage drops from 22V at terminal A to 10V at point F. The latter voltage is just equal to the zener voltage of zener diode 22. Because of the small base-emitter voltage drop of a transistor 24, this is for all practical purposes the power supply voltage at a point E for the local oscillator and mixer stages. Capacitor 21 enables currents at the carrier frequency to bypass the zener diode 22, and point E may be considered at ground potential as far as carrier currents are concerned.

The local oscillator part of converter 12 consists of a transistor 25, a resistor 26, a capacitor 27, a resistor 28, a resistor 29 and a quartz crystal 30. Transistor 25 and resistor 26 are connected in series between point F and terminal B with their junction being a point C. Resistors 28 and 29 are connected in series between point F and terminal B with their junction being connected to the base of transistor 25, through capacitor 27 to point C and through crystal 30 to terminal B. Transistor 25 serves as the active element in a crystal-controlled Colpitts oscillator. Capacitor 27 serves as the base-emitter capacitor; interelectrode capacitive coupling fulfills the role of emitter-collector capacitor; and quartz crystal 30, operating between its series and parallel resonant modes, provides the base-collector reactance. The output of the oscillator, taken across resistor 26 at point C, has a magnitude of 4V peak-to-peak at a frequency of 10.00 MHz as determined by the quartz crystal. Resistors 28 and 29 form a voltage-divider network to bias the base of transistor 25. It is important that all elements of the local oscillator be well shielded from the remainder of the circuit, and that connections thereto be as short and direct as possible.

The FET mixer part of converter 12 consists of capacitors 31, 38 and 48, an inductor 33, a dual-gate FET 34, resistors 35, 36, 37 and 47 and a voltage-variable capacitance diodes 45 and 46. Capacitor 31 and inductor 33 are connected in parallel between gate $G_1$ of FET 34 and terminal B. The drain electrode D of FET 34 is connected through resistor 35 to point E, the source electrode S is connected to terminal B and the gate $G_2$ is connected to the junction of resistors 36 and 37. Capacitor 38 is connected between point C and gate $G_2$, and capacitor 48 is connected between gate $G_2$ and terminal B. Capacitor 38 couples the local oscillator output to gate $G_2$ of the FET and blocks the d.c. at point C. Capacitor 48 is optional and may be used to regulate the amplitide of the voltage at gate $G_2$. Resistors 36 and 37 form a voltage-divider network to bias gate $G_2$ of the FET at +2 V d.c., upon which the 4 v peak-to-peak carrier is superimposed. Consequently, in the course of a carrier cycle the gate $G_1$ transconductance, defined as the change in drain current per unit in gate $G_1$ voltage, varies typically from 1 to 12.5 mmho; such a strong dependence of the gate $G_1$ transconductance upon the gate $G_2$ voltage is characteristic of the dual-gate FET. Now capacitor 31 together with inductor 33 comprise a tank circuit connected between gate $G_1$ and source (ground): Capacitor 31 represents the condenser microphone (static capacitance ≃ 20 pf). The voltage-variable capacitance diodes 45 and 46 provide means by which the tank circuit is tuned to the carrier frequency. The capacitance of these diodes is controlled by the voltage at terminal H which is applied from summing amplifier 19 through resistor 47 to the diodes. Inductor 33 contains a high-Q torroidal core (Q ≃ 150 at the carrier frequency). Resistor 35, the load resistor of the drain circuit, is chosen for optimal linear operation of the FET.

The carrier voltage at gate $G_2$ generates a component of drain current at the carrier frequency. As a result of drain-to-gate capacitive coupling a small fraction of the drain current leaks into the tank circuit and produces a voltage at gate $G_1$. The strong dependence of the gate $G_1$ transconductance upon the gate $G_2$ voltage causes the signal at gate $G_1$ to mix with that at gate $G_2$ and to generate a direct drain current component over and beyond the quiescent current. A change in capacitance 31 changes the level of this current; consequently, a periodic change in capacitance 31, as caused by the presence of sound at the microphone, produces a periodic FET drain current at the frequency of the sound. This component of the FET drain current will be called the "audio" current, even though in principle the frequency of such a current may extend from d.c. to several hundred kHz. The drain-to-gate capacitive coupling is an unwanted effect in a conventional mixer circuit, but here the effect is used to advantage and renders possible the detection of very small changes in capacitance 31.

The impedance translator part of converter 12 consists of transistor 24, capacitors 39 and 49, resistors 40 and 42 and a Darlington transistor 41. Transistor 24 and resistor 40 are connected in series between terminal A and point E with the base of transistor 24 connected to point F. Darlington transistor 41 and resistor 42 are connected in series between terminals A and B. Capacitor 49 is connected across resistor 42 to extend the bandwidth of the converter by increasing the gain of the impedance translator preferentially for higher acoustical frequencies. The collector of transistor 24, point G, is connected to the base of transistor 41 and through capacitor 39 to terminal B. The carrier and audio components of FET drain current pass through the base-emitter terminals of transistor 24, causing sympathetic variations in the collector voltage at point G. The capacitance 39 is of such a magnitude as to short-circuit currents at the carrier frequency, but not those at audio frequencies. Capacitor 39 nominally maintains a voltage of 15 V d.c. at point G; this voltage rises and drops concomitantly with rises and drops in the audio component of the FET drain current. Now the current entering point A from the zero drive amplifier, called the "line" current, splits at the node joining resistors 23, 40 and 42, part passing through each resistor. That part passing through resistor 42 enters the emitter of Darlington transistor 41. A small fraction of the emitter current exits the base and proceeds to point G; the remainder passes on to ground through the collector. The voltage drop across resistor 40 controls the base current of transistor 41, and this in turn controls the collector current. When the voltage at G rises or drops, these two parts of the line current drop or rise proportionally. Thus, the Darlington transistor 41 acts to lower the output impedance of the converter for better matching to the extremely low input impedance of the zero drive amplifier. The filtering action of capacitor 39 greatly attenuates the carrier current reaching the zero drive amplifier but has little effect upon the audio currents. The audio component of the line current is amplified by the zero drive amplifier 14.

FIG. 3 shows a circuit diagram of the differential amplifier-filter 16 and summing amplifier 19. The active element of the differential amplifier-filter is an integrated circuit FET input operational amplifier 51. Terminal I is connected to "test point 3" of the zero drive amplifier 14, at which point the voltage is dependent upon the quiescent condition of the converter. In the absence of sound at the microphone the voltage at terminal I varies proportionally with deviations from the optimal converter tuning point. The voltage at the inverting input of operational amplifier 51 is proportional to that at terminal I. Terminal J is connected to closed-loop reference voltage 18b; a fraction of this voltage appears at the non-inverting input of amplifier 51, depending upon the adjustment of rheostat 52. The voltage at the non-inverting terminal of amplifier 51 is the closed-loop reference voltage. In the closed-loop mode of operation the feedback control system continuously strives to make the voltage at the inverting terminal of amplifier 51 equal to that at the non-inverting terminal. The combination of resistors 54 and 55 and capacitors 56 and 57 provide two-pole, low-pass filtering, which blocks signals at the acoustical frequencies but passes the slowly-varying signals associated with automatic tuning. Resistor 53 is used to balance out the differential offset current. Resistor 58 in combination with rheostat 59 form a voltage divider, used to control the error voltage at the output terminal of the differential amplifier filter 16. By means of rheostat 59 the closed-loop gain of the system is adjusted: the gain must be sufficiently high for good regulation, yet low enough to prevent the onset of unstable oscillations in the feedback loop. The specifications of the low-pass filter are such as to require high values of resistance for resistors 54 and 55; this requirement necessitates that the operational amplifier 51 be of the FET type because of its extremely high input resistance.

Switch 17 is used to switch the system between the open-loop and closed-loop modes of operation. The closed position of the switch corresponds to the open-loop mode, for the error voltage is short-circuited and does not appear at the input of the summing amplifier 19.

The active element of the summing amplifier 19 is a monolithic operational amplifier 60. The summing point is located at the inverting input terminal. Here are summed the error voltage at the output terminal of amplifier filter 16 and the open-loop reference voltage 18a as adjusted by means of rheostat 61. An external calibration voltage 20 is also applied to the summing point through resistor 64. Resistors 62, 63 and 64 determine the currents entering the summing point from the three voltage sources; if the three resistances have equal values, then the three voltages will be summed with equal weighting. Resistor 65, a feedback resistor connected between the output terminal and the inverting input of the operational amplifier, determines the gain of the amplifier stage. Resistor 66, connected between the noninverting input terminal of the operational amplifier and ground, is used to balance out the differential offset current. Resistor 67 isolates the operational amplifier 60 from the capacitive loading of the long coaxial cable connected to the output H of the summing amplifier. The direct voltage at terminal H determines the capacitance of the voltage-variable capacitance diodes 45 and 46. Capacitor 68 suppresses high frequency noise generated along the control conductor but does not influence the control function itself.

For the purpose of tuning the converter the system is excited either by means of acoustical excitation of the microphone or by means of a calibration voltage 20 at an audio frequency. The tuning procedure consists of two steps. First switch 17 is thrown to the "open-loop" position and rheostat 61 is adjusted for optimal tuning. Then switch 17 is thrown to the closed-loop position and rheostat 52 is similarly adjusted for optimal tuning, under which condition the voltages at the two terminals of operational amplifier 51 match. A subsequent change in microphone capacitance, as may be caused by a variation in ambient temperature, will detune the converter, change the voltage at terminal I and drive the control system until the voltages at the two terminals of operational amplifier 51 again match.

The elements of the converter 12 are housed in a stainless steel tube approximately 4 inches long × 0.50-inch diameter × 0.022-inch wall thickness. One end contains a microphone connector onto which a half-inch microphone cartridge is screwed. The other end contains a three-conductor connector for connecting the terminals of the converter 12 to the corresponding terminals of the zero drive amplifier 14 over cable 13. The microphone connector may be General Radio part number 1560-2611, and the three-conductor connector may be Lemo Type RA 0303. The sources for the positive closed-loop reference voltage 18b and the negative open-loop reference voltage at terminal 18a may be taken from an existing power supply within the zero drive amplifier.

Circuit elements in the converter of FIG. 2 can have the same values as those given in U.S. patent application SN-354408 except for the following modifications: voltage-cariable capacitance diodes 45 and 46, 1N5463; resistors 36 and 47, 6.8 Mohm and 100 Kohm respectively; capacitors 48 and 49, 10 pf and 0.02 uf respectively.

Circuit elements that can be used in the feedback branch of FIG. 3 are the following: operational amplifiers 51 and 60 are AD 503 JH and AD 201 AH respectively; fixed resistors 54, 55, 53, 58, 62, 64, 65, 63, 66 and 67 are 10 Mohm, 10 Mohm, 2 Mohm, 1 Kohm, 10 Kohm, 10 Kohm, 10 Kohm, 10 Kohm, 3.3 Kohm, and 10 Kohm respectively; variable resistors 52, 59 and 61 are 10 Kohm, 1 Kohm, and 10 Kohm respectively; Capacitors 56, 57 and 68 are 2 uf, 3.3 uf, and 1 uf respectively.

The upper cutoff frequency of the filter section (components 54, 55 and 56) can be made selective by means of the switching arrangement shown in FIG. 4. Switch 70 is a 3-position, double-throw switch which permits the values of resistors 54 and 55 to be changed. The upper cutoff frequency corresponding to different values of resistors 54 and 55 are given in the following table:

| Upper Cutoff Frequency | Resistors Connected | Value of Resistance |
|---|---|---|
| 1 Hz | 54-1 and 55-1 | 100 K ohm |
| 0.1 Hz | 54-2 and 55-2 | 1 M ohm |
| 0.01 Hz | 54-3 and 55-3 | 10 M ohm |

Resistor 64 can be shunted by a capacitor in order to improve the frequency response of the system to a calibration signal.

Advantages of invention are numerous. The automatic tuning capability of the system is superior to that of prior art. Over the temperature range 40° to 130°F. the system maintains sensitivity to within 1 dB; that of a prior system was found to vary 2 dB. Other carrier systems do not feature automatic tuning. The system can be calibrated by an operator located several thousand feet from the microphone site. The system is insensitive to cable length up to at least 3000 feet and requires no special networks to terminate the cable. The system requires no source of electrical power at the site of the microphone. The specification of the system are of such latitude as to meet the requirements for measurement of both aircraft noise and sonic boom. The system is adapatable to a greater variety of microphone sizes than prior systems.

What is claimed is:

1. Instrumentation for measuring aircraft and sonic boom comprising:
   a condenser microphone means for varying a capacitor in accordance with the noise picked up by said microphone means;
   an oscillator for generating a carrier frequency;

a tank circuit including said capacitor;

voltage-responsive means for tuning said tank circuit to said carrier frequency;

means for applying a voltage to said voltage-responsive means;

a field-effect transistor means connected to receive the outputs from said oscillator and said tank circuit for producing an electrical signal containing said carrier frequency and the variations of said capacitor; and means for removing said carrier frequency from said electrical signal to obtain an electric current that is proportional to the sound pressure at the microphone.

2. Instrumentation according to claim 1 including a zero drive amplifier having an extremely low input impedance and a cable connecting said electric current that is proportional to the sound pressure at the microphone to the input of said zero drive amplifier.

3. Instrumentation according to claim 1 wherein said means for applying a voltage to said voltage-responsive means includes means for applying a calibration voltage to said voltage responsive means.

4. Instrumentation according to claim 2 wherein said means for applying a voltage to said voltage-responsive means includes means for obtaining a voltage from said zero drive current amplifier which is proportional to said electric current that is proportional to the sound pressure at the microphone.

5. Instrumentation according to claim 4 wherein said means for applying a voltage-to-voltage responsive means includes lowpass filtering means which blocks signals at the acoustical frequencies but passes the slowly varying signals associated with automatic tuning.

6. Instrumentation according to claim 5 wherein said means for applying a voltage to said voltage responsive means includes a differential amplifier for obtaining an error voltage from said voltage obtained from said zero drive current amplifier and a fixed reference voltage.

7. Instrumentation according to claim 6 wherein said means for applying a voltage to said voltage-responsive means includes a summing amplifier for summing said error voltage, a calibration voltage and a second reference voltage.

8. Instrumentation according to claim 3 wherein said means for applying a calibration voltage to said voltage-responsive means includes a summing amplifier for summing said calibration voltage with a fixed voltage.

9. Instrumentation according to claim 1 wherein said voltage-responsive means is a voltage-variable capacitance diode network.

10. Instrumentation according to claim 5 wherein said low-pass filtering means includes means for varying the upper cutoff frequency of the filtering means.

* * * * *